United States Patent [19]

Warren

[11] Patent Number: 4,754,552

[45] Date of Patent: Jul. 5, 1988

[54] HORTICULTURAL PRUNING TEMPLATE SYSTEM AND METHOD OF USING SAME

[76] Inventor: Lawrence L. Warren, 6586 Fruitgift Pl., Columbia, Md. 21045

[21] Appl. No.: 71,180

[22] Filed: Jul. 8, 1987

[51] Int. Cl.$^4$ .......................... G01C 15/00; G01B 3/14
[52] U.S. Cl. ........................................ 33/228; 33/277; 33/521; 33/565
[58] Field of Search .............. 33/1 LE, 228, 262, 276, 33/277, 521, 547, 563, 565, 566

[56] References Cited

U.S. PATENT DOCUMENTS

| D. 157,217 | 2/1950 | Vanderbrook | 33/563 |
| 745,257 | 11/1903 | Steadman | 33/262 |
| 1,511,668 | 10/1924 | Glanzer | 33/277 |
| 2,080,620 | 5/1937 | Martin | 33/565 |
| 2,679,691 | 6/1954 | Brownell | 33/521 |
| 2,883,756 | 4/1959 | Caldwell | 33/521 |
| 4,044,472 | 8/1977 | Jue | 33/521 |

FOREIGN PATENT DOCUMENTS

| 44729 | 9/1961 | Poland | 33/277 |
| 102421 | 8/1941 | Sweden | 33/277 |

Primary Examiner—Richard R. Stearns
Attorney, Agent, or Firm—Morton J. Rosenberg

[57] ABSTRACT

A horticultural pruning template system (10) is provided for aiding a user in pruning a horticultural object (12) to some predetermined contour. A template member (14) which is substantially transparent includes first indicia (18, 20, 22 or 24) formed thereon to provide a general outline contour for a design. Second indicia (28) which may be in the form of cross-hairs intersecting at a center point may be aligned with a predetermined point on object (12). The template (14) is releasably coupled to the horticultural object (12) through a string member (30) which is looped around and tied to the trunk (34) of horticultural object (12). The opposing end of the string (30) is tied through openings (38) formed in template (14) to template member (14). The user then may view horticultural object (12) at varying angles prior to trimming or cutting the horticultural object (12) into the predetermined contour. By continually viewing the horticultural object (12) at varying angles, and pruning object (12) in an iterative procedure, the user (16) is aided in producing and forming the object (12) into a precise contour.

20 Claims, 2 Drawing Sheets

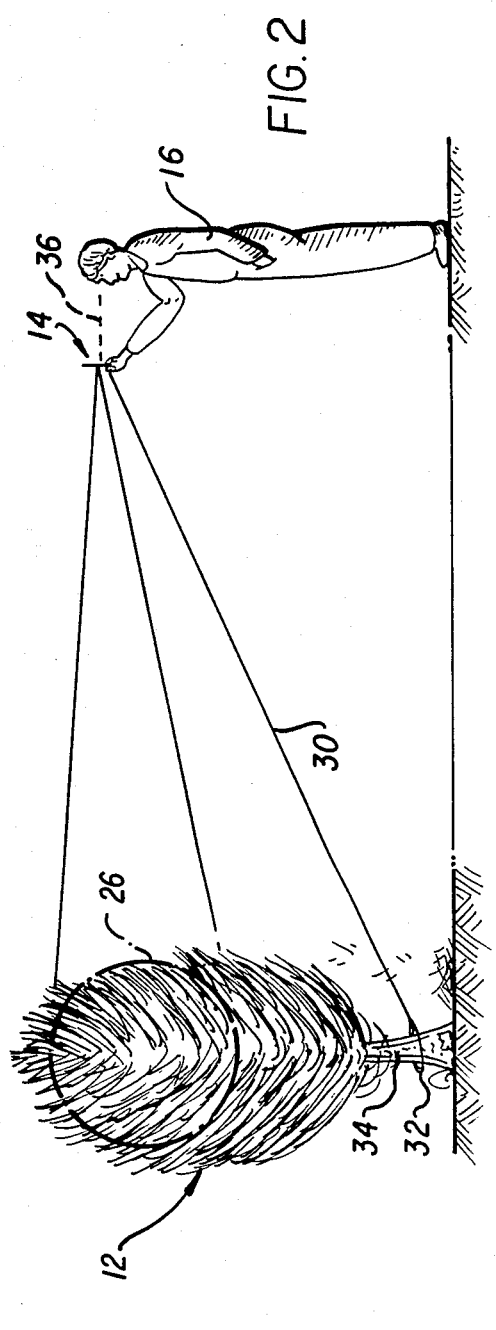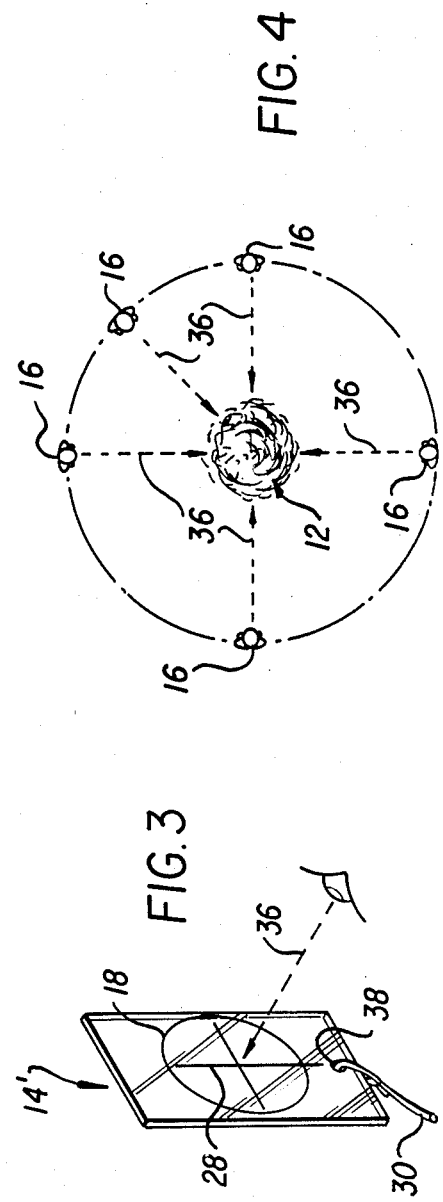

HORTICULTURAL PRUNING TEMPLATE SYSTEM AND METHOD OF USING SAME

BACKGROUND OF THE INVENTION

1. FIELD OF THE INVENTION

This invention pertains to horticultural objects such as shrubs or trees being pruned or trimmed to a predetermined contour. In particular, this invention relates to a horticultural pruning template system and method of using same which aids the user in pruning a shrub or tree or plant to a predetermined contour design. Further, this invention is directed to a pruning template system which allows the user to prune a horticultural object to a precise design contour. Still further, this invention relates to a method wherein the user may maintain a substantially constant perspective of the horticultural object to be pruned in a varying line of sight positional location throughout a singular pruning operation. More in particular, this invention pertains to a pruning template system which includes a template member for viewing the horticultural object with a substantially constant perspective at varying angles of sight when the user is displaced from the horticultural object at a predetermined distance. Additionally, this invention is directed to a template member which is substantially transparent and has particular indicia formed thereon in the general outline of a predetermined contour to which the horticultural object is to be trimmed. Further, this invention is directed to a template system wherein a reference point on the horticultural object may be maintained throughout a singular pruning operation. Further, this invention directs itself to the combination of a substantially transparent template member having contour indicia formed thereon in combination with a flexible coupling of the template member to the horticultural object to be trimmed.

2. Prior Art

Trimming or cutting of horticultural objects to predetermined shapes is well-known in the art. In prior art methods, the user would trim or cut the object to the best shape possible without being able to be provided with a constant perspective of the outline design throughout the pruning operation. Pruning gauges are known in the art, however, such pruning gauges previously utilized do not allow the procedures and precise contour designs of the subject invention concept.

The best prior art known to Applicant includes U.S. Pat. Nos. 975,057; 4,044,472; 555,287; 3,138,874; 2,478,081; 2,679,691; 2,883,756; 865,586; 4,490,916; 1,987,010; and, 808,511.

Pruning gauges, such as that shown in U.S. Pat. No. 975,057 provide for the broad objectives of guiding horticulturalists in pruning or trumming shrubs or hedges. However, systems such as that shown in this U.S. Patent provide for a pair of side members and a head member with the side members having a curved portion and a straight portion section. The head member has a curved portion and a straight portion and the two members are provided with apertures. The devices are used by arranging such in a position wherein feet rest on the ground on opposing sides of the object to be trimmed with portions of the device bearing over the plant or shrub. Such forms a guide for pruning the shrub to a corresponding contour. However, such does not provide for the wide variety of contours that may be formed with the subject invention concept and does not allow for the constant perspective adjusting system, as is herein described.

In other prior art systems such as that shown in U.S. Pat. No. 4,044,472, the device is manually adjusted along a shaft dependent upon the height to which a plant or shrub is to be trimmed. A segment on the device is adjusted so that the angle such makes with the vertical causes a guide member to have some specific contour. When the guide member is adjusted, the shrub or hedge is cut and the growth is cut along the contour as is defined by the guide member. Once again in such prior art systems, such does not provide for the unique combination of elements which allows the user to trim or prune the horticultural object in a wide variety of contours while maintaining a constant perspective of the overall system.

Other systems such as that shown in U.S. Pat. No. 555,287 are directed to drafting devices. Such may have indicia formed thereon, however, such are not provided with indicia for the purposes and objectives of the subject invention concept and are not utilizable for trimming or pruning horticultural objects.

SUMMARY OF THE INVENTION

A horticultural pruning template system for aiding a user in pruning a horticultural object to a predetermined contour is provided. The horticultural pruning template system includes a template mechanism for viewing the horticultural object with a substantially constant perspective at varying angles of sight when the user is displaced from the horticultural object at a predetermined distance. The template system further includes a coupling member which is releasably secured to the horticultural object and the template mechanism on opposing ends thereof for maintaining the predetermined distance.

BRIEF DESCRIPTION OF THE DRAWINGS

FIG. 2 is an elevational view of a user aligning the template member 14 with a horticultural object to be trimmed;

FIG. 3 is an embodiment of the subject template system showing a singular first indicia formed on a plate member; and, FIG. 4 is a top view of a user utilizing the subject horticultural pruning template system during a singular pruning operation.

DESCRIPTION OF THE PREFERRED EMBODIMENTS

Figure 1:
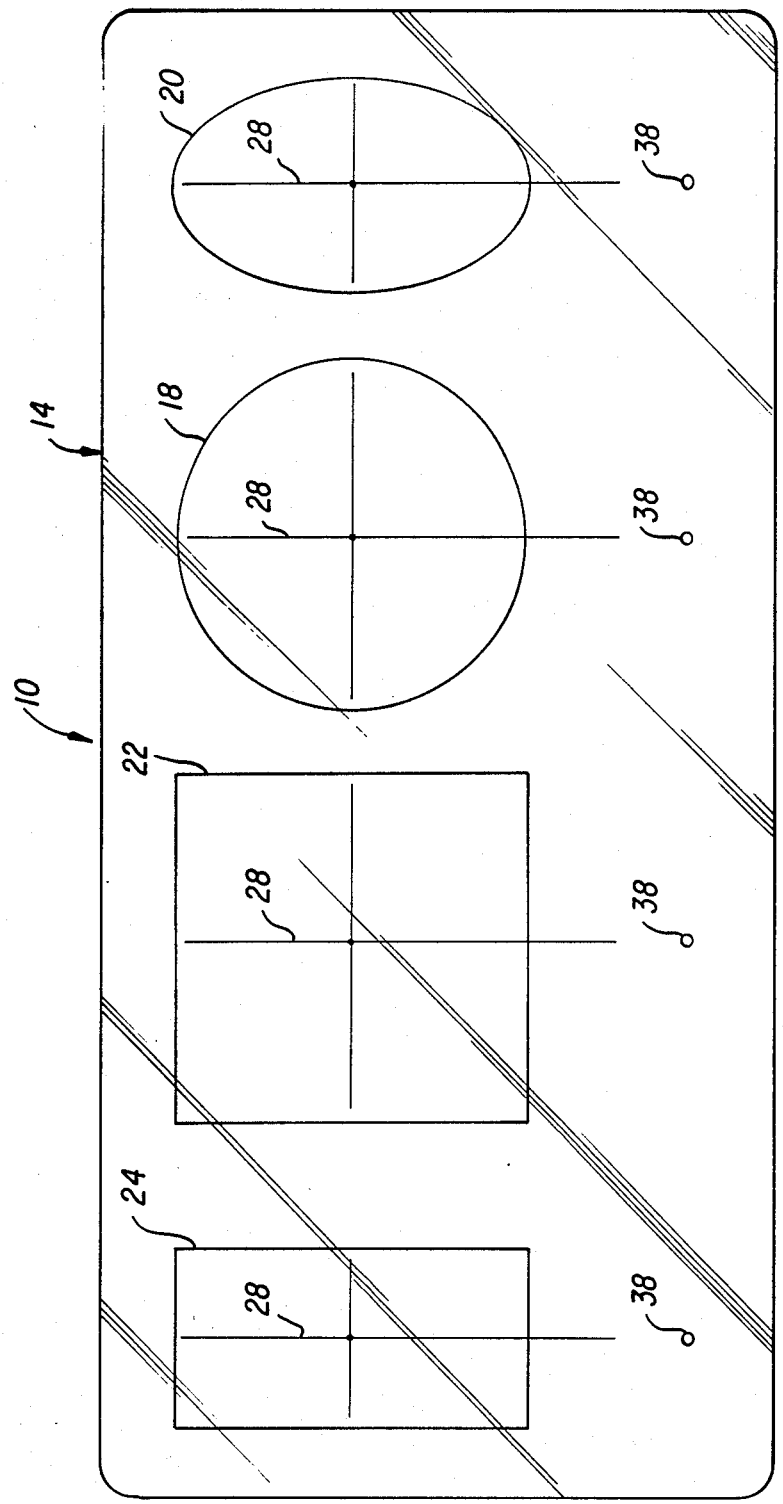
FIG. 1 is a frontal view of the template member of the subject template system.

Referring now to FIGS. 1-4, there is shown horticultural pruning template system 10 and a method for aiding the user in pruning horticultural object 12 to a predetermined contour. Pruning of horticultural objects such as shrubbery, trees, and plants, has long been a part of the gardening profession. Recently, the concept of individualistically pruning horticultural objects 12 to individualistic tastes has become a burgeoning hobby for non-professionals. The basic problem associated with pruning horticultural objects 12 to specific shapes is that the pruning procedure is extremely unforgiving. Once a pruning or cutting of the plant, shrub or tree has been made, the user must accept the results. Thus, the art of pruning shrubbery or trees to specific designs must be done very carefully and with great planning foresight. Horticultural template system 10 as herein described provides the user with the ability of being able to maintain a constant perspective of the overall design visualized and further, allows the user to maintain a constant update of the pruning procedure during the cutting process.

Horticultural pruning template system 10 includes template member 14 for viewing horticultural objects 12 with a substantially constant perspective at varying angles of sight when user 16 is displaced from horticultural object 12 at a predetermined distance. Template member 14 as is shown in FIG. 1 is substantially a plate member which generally is planar in construction. Template member 14 is substantially transparent in composition such that user 16 may view horticultural object 12 therethrough as is illustrated in FIG. 2.

As shown in FIG. 1, template member 14 may be rectangular in contour for ease of manually grasping such, however, the boundary contour is not important to the inventive concept as is herein described.

An important consideration of horticultural pruning template system 10 is that template member 14 be substantially transparent or at least translucent such that user 16 may have a view of horticultural object 12 therethrough. Additionally, template member 14 may be tinted in color if desired however, such is not critical to the general concept of template system 10.

Template member 14 is adapted to be grasped by user 16 and may be formed of a plastic composition. Template member 14 may be substantially rigid or have some flexibility dependent upon the thickness of template member 14. It is to be understood that template member 14 although preferably formed of a plastic composition, may include a composition formation of glass or some other compound with the only restriction that such be substantially transparent, as has hereinbefore been described.

As shown in FIG. 1, template member 14 may have a plurality of well-known indicia 18, 20, 22 and 24 formed thereon. Each of indicia 18, 20, 22 and 24 may be used separately during a particular pruning project by user 16 or may be used in conjunction each with respect to the other during a singular pruning project to provide differing contours for the cutting of horticultural object 16. Thus, during one pruning project, user 16 may utilize circular first indicia 18 in combination with elliptical first indicia 20 and square indicia 22 or rectangular first indicia 24 as is needed for an individualistic contour. Obviously, where user 16 is merely providing for one of the well-known contours as shown in FIG. 1, that particular contour 18, 20, 22 or 24 will be utilized with the corresponding first indicia.

As shown in FIG. 3, template member 14' may have a singular first indicia 18 formed thereon for use in providing a particular outline 26 as is shown in FIG. 2.

Template member 14 may be of any reasonable overall dimensional size which is convenient to be manually grasped by user 16. However, one template member 14 which has been commercially used with success measures 8"×11" with an outline of circular first indicia 18 measuring approximately 6" in diameter. The overall size of template member 14 for ease of use generally is dependent upon the parameters of the size of horticultural object 12, the distance user 16 is displaced from object 12, as well as the intricacy of particular indicia 18, 20, 22 or 24.

Horticultural pruning template member 14 further includes second indicia 28 formed on plate member 14. Second indicia 28 defines a reference indicia for first indicia 18, 20, 22 and 24. Second indicia 28 may be cross-hairs which meet at the center of the particular first indicia 18, 20, 22 or 24. Second indicia 28 is used as a reference point which is visually aligned by user 16 with a randomly selected portion or point of horticultural object 12. In this manner, when user 16 is displaced by a predetermined distance from horticultural object 12, and cross-hairs or second indicia 28 are aligned with a particular selected point on object 12, user 16 then has a particular standard for pruning object 12 along the particular outline defined by first indicia 18, 20, 22 or 24.

First indicia 18, 20, 22 and 24 may be etched or otherwise fixedly secured to plate member 14. Alternatively, indicia such as circular first indicia 18 may be drawn on template member 14 in an individualistic contour as decided by user 16. A removable first indicia may be formed by utilization of crayon compatible to a plastic composition forming template member 14. Thus, where a removable dish is utilized by user 16, user 16 may merely erase first indicia as needed and re-draw the indicia for a second or subsequent pruning operation.

Horticultural pruning template system 10 further includes coupling member 30 releasably secured to horticultural object 12 and template member 14 on opposing ends thereof for maintaining a predetermined distance between user 16 and horticultural object 12 during a pruning operation. As shown in FIG. 2, coupling member 30 may be a string or other flexible member which is attached to template member 14 on one end and loosely attached to horticultural object 12 on an opposing end.

In one form, coupling member 30 forms a loop 32 on one end which loosely surrounds trunk 34 of object 12.

In the most simple form, coupling member 30 may be a string member wherein loop 32 is formed around trunk 34 and tied. This releasable coupling allows the user to remove coupling member 30 from object 12 subsequent to the overall pruning operation. Additionally, the loop 32 being loosely coupled to trunk 34 allows user 16 during a singular pruning operation to move around object 12 to varying lines of sight is depicted in FIG. 4. The lines of sight 36 as shown in FIG. 4 allow the user to provide for a symmetrical viewing of object 12 during a singular pruning operation. Additionally, due to the fact that coupling member 30 allows the user 16 to maintain a predetermined distance from horticultural object 12 during a singular pruning operation, the perspective of the overall final contour design is maintained by user 16.

As shown clearly in FIGS. 1 and 3, template member 14 includes template openings 38 which pass through template member 14. Openings 38 are generally associated with first indicia 18, 20, 22 and 24 and for ease of use, are generally vertically aligned with second indicia 28 as is shown. In this manner, string or coupling member 30 may be looped through one opening 38 and then knotted to prevent removal from template 14 during a singular pruning operation.

Template system 10 provides for a unique method of pruning horticultural object 12 to a predetermined contour or design. As has been stated, user 16 may utilize a permanent first indicia outline 18, 20, 22 or 24, or in the alternative, may be provided with a permanent unique type design such as in the form of an animal, or some other contour, not important to the inventive concept as herein described. Further, template 14 may be provided with second indicia 28 in a permanent fashion and user 16 may draw his or her unique design contour around such for allowing individualistic contour designs at the behest of user 16.

Once user 16 has decided upon a particular contour, he or she establishes a predetermined distance from user 16 to horticultural object 12. In general, this may be accomplished by holding template member or plate member 14 in front of the face of user 16 and looking through the outline design while standing at an appropriate distance from object 12 to assure that the outlined shape fits within objects 12 natural growth of foliage. At this time, user 16 may also establish a center reference point on object 12 through which cross hairs 28 may be used at their intersection point throughout the pruning operation.

The step of establishing a predetermined distance between user 16 and object 12 for a particular pruning operation includes the step of releasably coupling plate member 14 to horticultural object 12. Releasable coupling of plate member 14 to horticultural object 12 includes the step of tieing opposing ends of string member 30 to horticultural object 12 and plate member 14 respectively, as is shown in FIG. 2.

Horticultural object 12 is then observed through substantially transparent plate member 14 having indicia 18, 20, 22 or 24 formed thereon in the predetermined contours as previously described. During a particular sighting, user 16 may align second indicia 28 with a particular point on horticultural object 12 as is shown. In this manner, a particular line of sight 36 is provided at a particular positional location of user 16 with respect to horticultural object 12.

In one line of sight, horticultural object 12 is then trimmed or cut in accordance with the particular predetermined indicia contour. User 16 may then move to a second or subsequent line of sight as is shown in FIG. 4 while maintaining the same predetermined distance as previously found.

In summary, user 16 may initially hold template member 14 in front of his/her line of sight while second indicia 28 is visually aligned with some randomly selected point at the center of object 12. As has been stated, it is important the outline shape or contour fits within object 12 natural growth of foliage. Once object 12 center reference point is selected, such may be marked with a ribbon or string, or some other element tied around object 12 in a manner such that it may be viewed from all positional locations as shown in FIG. 4. In order to establish the fixed distance from object 12 to template member 14, string 30 is tied loosely around trunk 34 through loop 32 and the other end of string 30 is passed through opening 38 formed in template member 14.

By moving towards or away from object 12, and aligning the design indicia with the natural foliage growth of object 12, the appropriate distance is found from object 12 to template 14. Slack on string 30 is then taken up and a knot is tied on template 30. By viewing object 12 through substantially transparent template member 14 with the distance fixed and the center point of object 12 marked and aligned with template center reference point, user 16 may determine at what spot each branch or foliage member may be trimmed without losing perspective of the overall design or dimension of the formal or unique shape into which object 12 is to be pruned.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A horticultural pruning template system for aiding a user in pruning a horticultural object to a predetermined contour comprising:
   (a) template means for viewing said horticultural object with a substantially constant perspective at a plurality of locations around said horizontal object when said user is displaced from said horticultural object at a predetermined distance, said template means including a plate member for viewing said horticultural object therethrough; and,
   (b) coupling means releasably secured to said horticultural object and said template means on opposing ends of said coupling means for maintaining said predetermined distance.

2. The horticultural pruning template system as recited in claim 1 where said plate member is substantially transparent.

3. The horticultural pruning template system as recited in claim 2 where said plate member is substantially planar.

4. The horticultural pruning template system as recited in claim 2 where said plate member includes first indicia formed thereon, said first indicia defining at least one predetermined contour.

5. The horticultural pruning template system as recited in claim 4 including second indicia formed on said plate member, said second indicia defining a reference indicia for said predetermined first indicia contour.

6. The horticultural pruning template system as recited in claim 4 where said first indicia is removably formed on said plate member.

7. The horticultural pruning template system as recited in claim 4 where said first indicia is etched into said plate member.

8. The horticultural pruning template system as recited in claim 4 where said plate member is formed of a plastic composition.

9. The horticultural pruning template system as recited in claim 1 where said coupling means includes a flexible string member tied to said horticultural object on one end and to said plate member on an opposing end thereof.

10. The horticultural pruning template system as recited in claim 9 where said flexible string member is tied to said plate member through an opening formed in said plate member.

11. The horticultural pruning template system as recited in claim 1 where said plate member includes a plurality of first indicia contours formed thereon.

12. The horticultural pruning template system as recited in claim 11 where each of said first indicia contours includes means for releasably coupling said plate member to said horticultural object.

13. A method of pruning a horticultural object including the steps of:
   (a) establishing a predetermined distance from a user to said horticultural object;

(b) observing said object through a substantially transparent plate member having indicia formed thereon in a predetermined contour; and, (c) trimming said horticultural object in accordance with said indicia predetermined contour.

14. The method of pruning a horticultural object as recited in claim 13 where the step of establishing said predetermined distance includes the step of releasably coupling said plate member to said horticultural object.

15. The method of pruning a horticultural object as recited in claim 14 where the step of releasably coupling includes the step of tying opposing ends of a string member to said horticultural object and said plate member respectively.

16. The method of pruning a horticultural object as recited in claim 13 where the step of establishing said predetermined distance is preceded by the step of forming said indicia on said plate member.

17. The method of pruning a horticultural object as recited in claim 13 where the step of observing said object includes the step of aligning a predetermined observable point on said object with a user's eye.

18. The method of pruning a horticultural object as recited in claim 17 where the step of aligning includes the step of sighting said horticultural object through cross-hair indicia formed on said plate member.

19. The method of pruning a horticultural object as recited in claim 13 where the step of trimming said horticultural object is followed by the step of observing said object at a differing angle of sight than said first observation.

20. The method of pruning a horticultural object as recited in claim 13 where said plate member is formed of a substantially transparent plastic composition.

* * * * *